US011773907B2

(12) United States Patent
Liu et al.

(10) Patent No.: US 11,773,907 B2
(45) Date of Patent: Oct. 3, 2023

(54) THRUST GAS BEARING, CENTRIFUGAL COMPRESSOR EQUIPPED WITH SAME, AND REFRIGERATION APPARATUS EQUIPPED WITH SAME

(71) Applicant: DAIKIN INDUSTRIES, LTD., Osaka (JP)

(72) Inventors: Bichuan Liu, Osaka (JP); Kouichi Tanaka, Osaka (JP); Kousuke Nishimura, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/955,217

(22) Filed: Sep. 28, 2022

(65) Prior Publication Data
US 2023/0014246 A1    Jan. 19, 2023

Related U.S. Application Data

(63) Continuation of application No. PCT/JP2021/007480, filed on Feb. 26, 2021.

(30) Foreign Application Priority Data

Mar. 31, 2020 (JP) .................... 2020-062135

(51) Int. Cl.
F16C 37/00 (2006.01)
F16C 17/04 (2006.01)
F25B 31/02 (2006.01)

(52) U.S. Cl.
CPC .......... *F16C 37/002* (2013.01); *F16C 17/042* (2013.01); *F25B 31/02* (2013.01); *F16C 2360/44* (2013.01)

(58) Field of Classification Search
CPC ...... F16C 17/042; F16C 37/00; F16C 37/002; F16C 2360/44; F16C 2362/52; F25B 31/02; F04D 29/0513; F04D 29/584
See application file for complete search history.

(56) References Cited

U.S. PATENT DOCUMENTS 5,827,040 A * 10/1998 Bosley ................ F16C 32/0692
417/407
7,112,036 B2 * 9/2006 Lubell ..................... F01D 25/16
417/407

(Continued)

FOREIGN PATENT DOCUMENTS

JP    2014-70730 A    4/2014
JP    2015-510091 A   4/2015

OTHER PUBLICATIONS

International Preliminary Report of corresponding PCT Application No. PCT/JP2021/007480 dated Oct. 13, 2022.

(Continued)

*Primary Examiner* — Alan B Waits
(74) *Attorney, Agent, or Firm* — Global IP Counselors, LLP

(57) ABSTRACT

A thrust gas bearing includes a collar portion fixed to a shaft portion, a first base part facing one axial end surface of the collar portion, a first gas film forming part formed between the collar portion and first base part, a second base part facing an other axial end surface of the collar portion, a second gas film forming part formed between the collar portion and second base part, and a cooling flow path to carry a fluid flow. The cooling flow path includes a first flow path formed on one axial end side of the first base part and extending from an axial center toward an outer periphery, and a second flow path formed on an other axial end side of the second base part and extending from an outer periphery toward an axial center. The second flow path is located downstream of the first flow path.

15 Claims, 10 Drawing Sheets

(56) References Cited

U.S. PATENT DOCUMENTS

2013/0188895 A1 7/2013 Devitt
2016/0281721 A1* 9/2016 Army, Jr. ............ F04D 29/5806

OTHER PUBLICATIONS

International Search Report of corresponding PCT Application No. PCT/JP2021/007480 dated Apr. 6, 2021.
European Search Report of corresponding EP Application No. 21 78 1830.1 dated Jun. 14, 2022.

* cited by examiner

THE OTHER SIDE ⟵⟶ ONE SIDE
AXIAL DIRECTION

THE OTHER SIDE ←——→ ONE SIDE
AXIAL DIRECTION

THRUST GAS BEARING, CENTRIFUGAL COMPRESSOR EQUIPPED WITH SAME, AND REFRIGERATION APPARATUS EQUIPPED WITH SAME

CROSS-REFERENCE TO RELATED APPLICATIONS

This is a continuation of International Application No. PCT/JP2021/007480 filed on Feb. 26, 2021, which claims priority to Japanese Patent Application No. 2020-062135, filed on Mar. 31, 2020. The entire disclosures of these applications are incorporated by reference herein.

BACKGROUND

Technical Field

The present disclosure relates to a thrust gas bearing, a centrifugal compressor including the same, and a refrigeration apparatus including the same.

Background Art

A thrust bearing including a cooling mechanism has been known. A thrust bearing of this type is described, for example, in Japanese Unexamined Patent Publication No. 2014-70730 (in particular, paragraphs 0058 to 0060). Part of a cooling fluid introduced from a flow path into a thrust bearing in a second form disclosed in Patent Document 1 flows into a first container, and is partially drawn into a bearing spacer through a through groove formed on the bearing spacer. The remainder passes through a guide groove formed on the outer surface (back surface) of each base plate, passes through a radial bearing to cool the radial bearing, and is then discharged from the flow path. At this moment, a flow from the outer circumferential side toward the inner circumferential side is formed in the bearing space, and the cooling fluid drawn into the bearing spacer flows smoothly toward the inner circumferential side of the thrust bearing (toward a shaft). Part of the cooling fluid that has reached an inner circumferential portion of the thrust bearing is guided to the guide groove formed on the outer surface (back surface) of each base plate, and is again guided to the outer circumferential side of the thrust bearing to merge with the cooling fluid introduced from the flow path.

SUMMARY

A first aspect of the present disclosure is directed to a thrust gas bearing including a collar portion fixed to a shaft portion, a first base part facing one axial end surface of the collar portion, a first gas film forming part formed between the collar portion and the first base part, a second base part facing an other axial end surface of the collar portion, a second gas film forming part formed between the collar portion and the second base part, and a cooling flow path configured to carry a fluid flow therethrough. The cooling flow path includes a first flow path formed on one end side in an axial direction of the first base part and extending from an axial center toward an outer periphery of the first base part, and a second flow path formed on an other end side in the axial direction of the second base part and extending from an outer periphery toward an axial center of the second base part. The second flow path is located downstream of the first flow path.

DETAILED DESCRIPTION OF EMBODIMENT(S)

First Embodiment

An embodiment of the present disclosure will be described.

1. Overview of Refrigeration Apparatus

Figure 1:
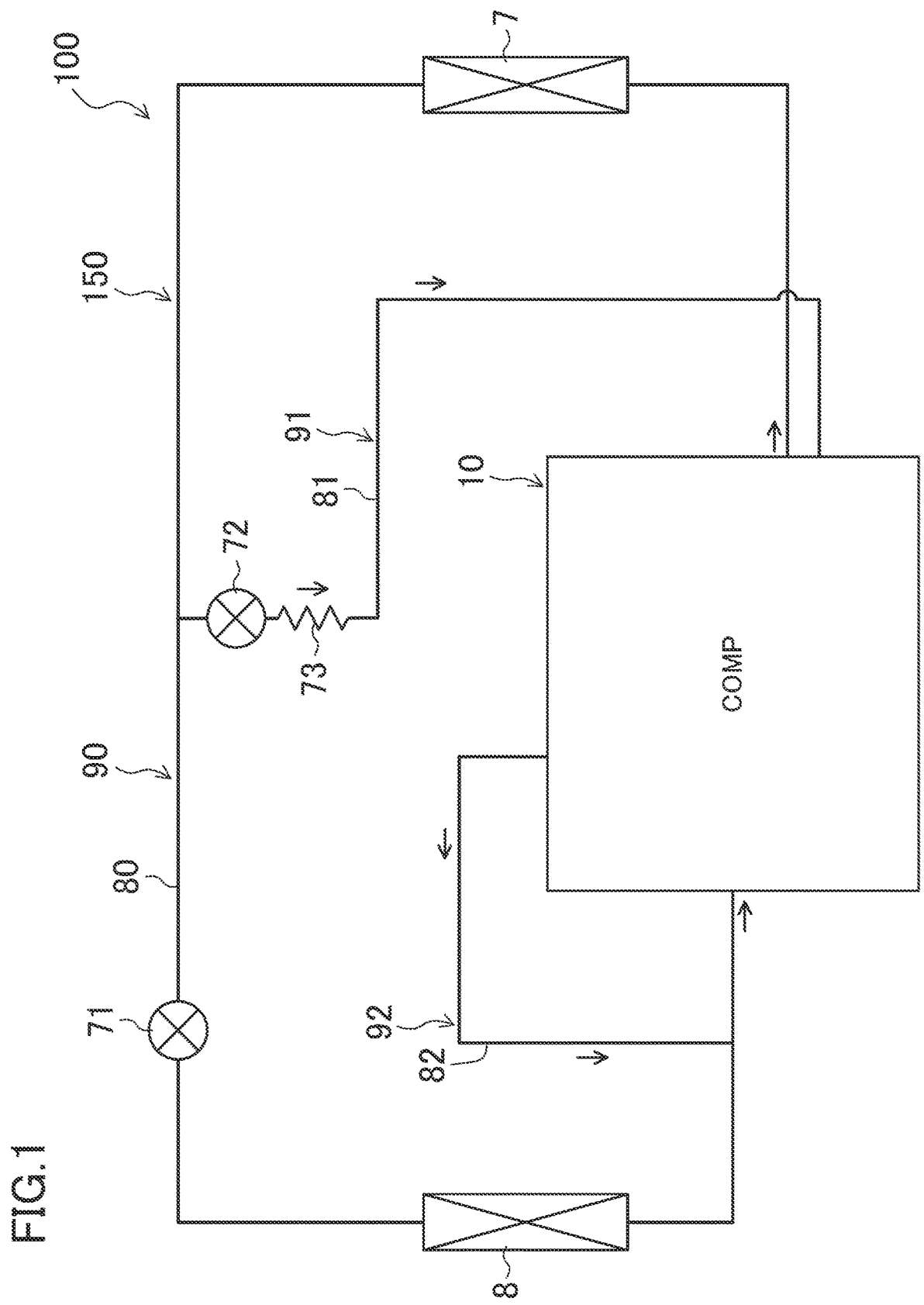
FIG. 1 is an outline drawing showing a refrigerant circuit (150) of a refrigeration apparatus (100) including a centrifugal compressor (10).

First, a refrigeration apparatus (100) according to this embodiment will be described with reference to FIG. 1. FIG. 1 is an outline drawing showing a refrigerant circuit (150) of the refrigeration apparatus (100). The refrigeration apparatus (100) includes a centrifugal compressor (10) according to an embodiment of the present disclosure. The refrigeration apparatus (100) includes the refrigerant circuit (150) filled with a refrigerant. The refrigerant circulates in the refrigerant circuit (150) to perform a vapor compression refrigeration cycle. The refrigerant circuit (150) includes the centrifugal compressor (10), a condenser (7), a first expansion valve (71), an evaporator (8), a main circuit (90), a branch circuit (supply path) (91), a second expansion valve (72), a heater (73), a return circuit (92), and an auxiliary circuit (93).

Figure 2:
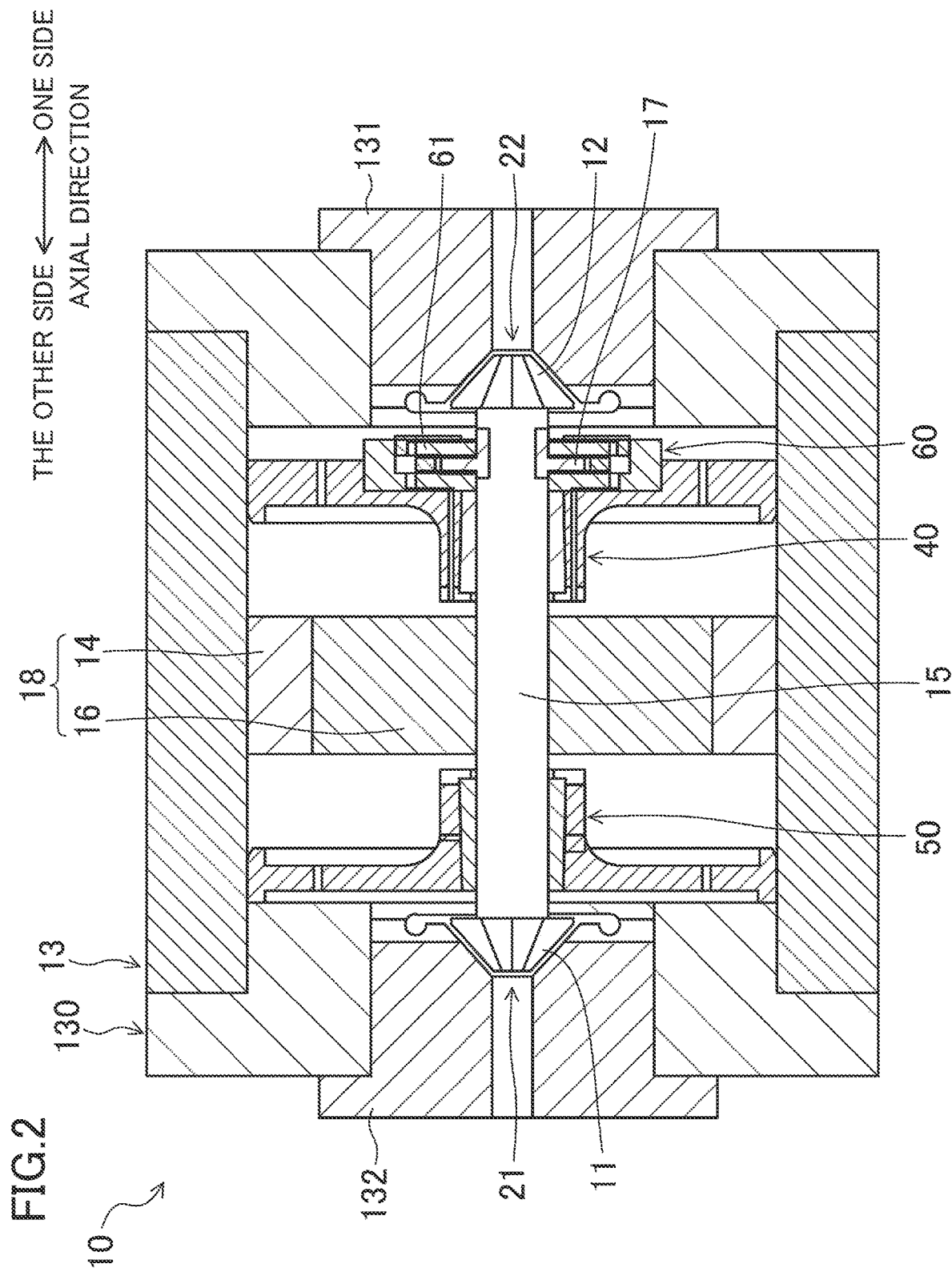
FIG. 2 is a longitudinal sectional view of the centrifugal compressor (10).

The centrifugal compressor (10) shown in FIGS. 1 and 2 includes a low-pressure impeller (11) and a high-pressure impeller (12) connected to each other in series. The centrifugal compressor (10) compresses the refrigerant in two stages by using the low-pressure impeller (11) and the high-pressure impeller (12). That is to say, the low-pressure impeller (11) and the high-pressure impeller (12) form a compression mechanism (19). The centrifugal compressor (10) will be described in detail later.

The condenser (7) and the evaporator (8) shown in FIG. 1 are cross-fin type fin-and-tube heat exchangers. A fan is provided near each of the condenser (7) and the evaporator (8). Each of the first and second expansion valves (71) and

(72) is an electronic control valve having a variable opening degree. The heater (73) is a heating device having a known configuration.

The centrifugal compressor (10), the condenser (7), the first expansion valve (71), and the evaporator (8) are sequentially connected together through a main pipe (80) to form the main circuit (90). The refrigerant flows through the main pipe (80). One end of a branch pipe is connected to a portion of the main pipe (80) between the condenser (7) and the first expansion valve (71). The refrigerant flows through the branch pipe (81). The second expansion valve (72) and the heater (73) are sequentially located at an intermediate portion of the branch pipe (81) from near the one end. The other end of the branch pipe (81) is connected to a space immediately behind the high-pressure impeller (12) of the centrifugal compressor (10). The branch pipe (81), the second expansion valve (72), and the heater (73) form the branch circuit (91).

One end of a return pipe (82) is connected to a portion of the main pipe (80) between the evaporator (8) and the centrifugal compressor (10). The refrigerant flows through the return pipe (82). The other end of the return pipe (82) is located near an axially central portion of a shaft portion (15) of the centrifugal compressor (10) in a casing (13) to be described later. The return pipe (82) forms the return circuit (92).

The auxiliary circuit (93) includes an auxiliary pipe (83). One end of the auxiliary pipe (83) is connected to an outer peripheral portion of a low-pressure impeller chamber (21) to be described later, and the other end thereof is connected to a central portion of a high-pressure impeller chamber (22) to be described later. The auxiliary pipe (83) connects the discharge side of the low-pressure impeller chamber (21) and the suction side of the high-pressure impeller chamber (22) together.

2. Schematic Configuration of Centrifugal Compressor

The centrifugal compressor (10) according to this embodiment will be described below with reference to FIG. 2. FIG. 2 is a longitudinal sectional view of the centrifugal compressor (10). In the following description, a direction of extension of the shaft portion (15) of the centrifugal compressor (10) may be referred to as the "axial direction," a direction perpendicular to the axial direction as the "radial direction," and a direction along the periphery of the shaft portion (15) as the "circumferential direction." However, these directions do not limit the orientation and other features of the centrifugal compressor (10) during use or assembly.

The centrifugal compressor (10) includes the casing (13), a stator (14), a rotor (16), the shaft portion (15), the low-pressure impeller (11), the high-pressure impeller (12), a first radial gas bearing (40), a second radial gas hearing (50), and a thrust gas hearing (60).

The casing (13) houses therein other members forming the centrifugal compressor (10). The casing (13) includes a barrel (130), a first closing member (131), and a second closing member (132). The barrel (130) is a generally tubular member extending in the axial direction. One side of the barrel (130) in the axial direction is closed by the first closing member (131). The high-pressure impeller chamber (22) is formed between the first closing member (131) and the high-pressure impeller (12) described above. The other side of the barrel (130) in the axial direction is closed by the second closing member (132). The low-pressure impeller chamber (21) is formed between the second closing member (132) and the low-pressure impeller (11) described above.

The stator (14) is generally cylindrical. The stator (14) is fixed to an inner peripheral surface of the barrel (130) at an axially central portion of the barrel (130). The rotor (16) is generally cylindrical. The rotor (16) is disposed inside the stator (14) in the radial direction. The rotor (16) is radially spaced apart from the stator (14). Either one of the stator (14) or the rotor (16) is provided with magnets. The other one of the stator (14) or the rotor (16) is provided with coils. The interaction between magnetic flux and current between the stator (14) and the rotor (16) causes the rotor (16) to rotate relative to the stator (14).

The shaft portion (15) extends in the axial direction. The shaft portion (15) is located inside the rotor (16) in the radial direction. The shaft portion (15) is, so to say, a motor shaft. That is, a combination of the stator (14) and the rotor (16) forms an electric motor (18), with which the shaft portion (15) is coupled. The shaft portion (15) rotates at the same number of revolutions as the rotor (16) and in the same direction as the rotor (16). The high-pressure impeller (12) is fixed to an end of the shaft portion (15) on one side in the axial direction. The low-pressure impeller (11) is fixed to another end of the shaft portion (15) on the other side in the axial direction.

The first radial gas hearing (40) is located between the rotor (16) and the high-pressure impeller (12) in the axial direction. The first radial gas bearing (40) forms a tubular gas film between the shaft portion (15) and the barrel (130), so that the one side of the shaft portion (15) in the axial direction is rotatably supported relative to the barrel (130).

The second radial gas bearing (50) is located between the rotor (16) and the low-pressure impeller (11) in the axial direction. The second radial gas bearing (50) forms a tubular gas film between the shaft portion (15) and the barrel (130), so that the other side of the shaft portion (15) in the axial direction is rotatably supported relative to the barrel (130). The second radial gas bearing (50) has a configuration equivalent to that of the first radial gas bearing (40). Thus, only a specific configuration of the first radial gas bearing (40) will be described below to avoid repetitive descriptions. A detailed configuration of the first radial gas bearing (40) will be described later.

Figure 3:
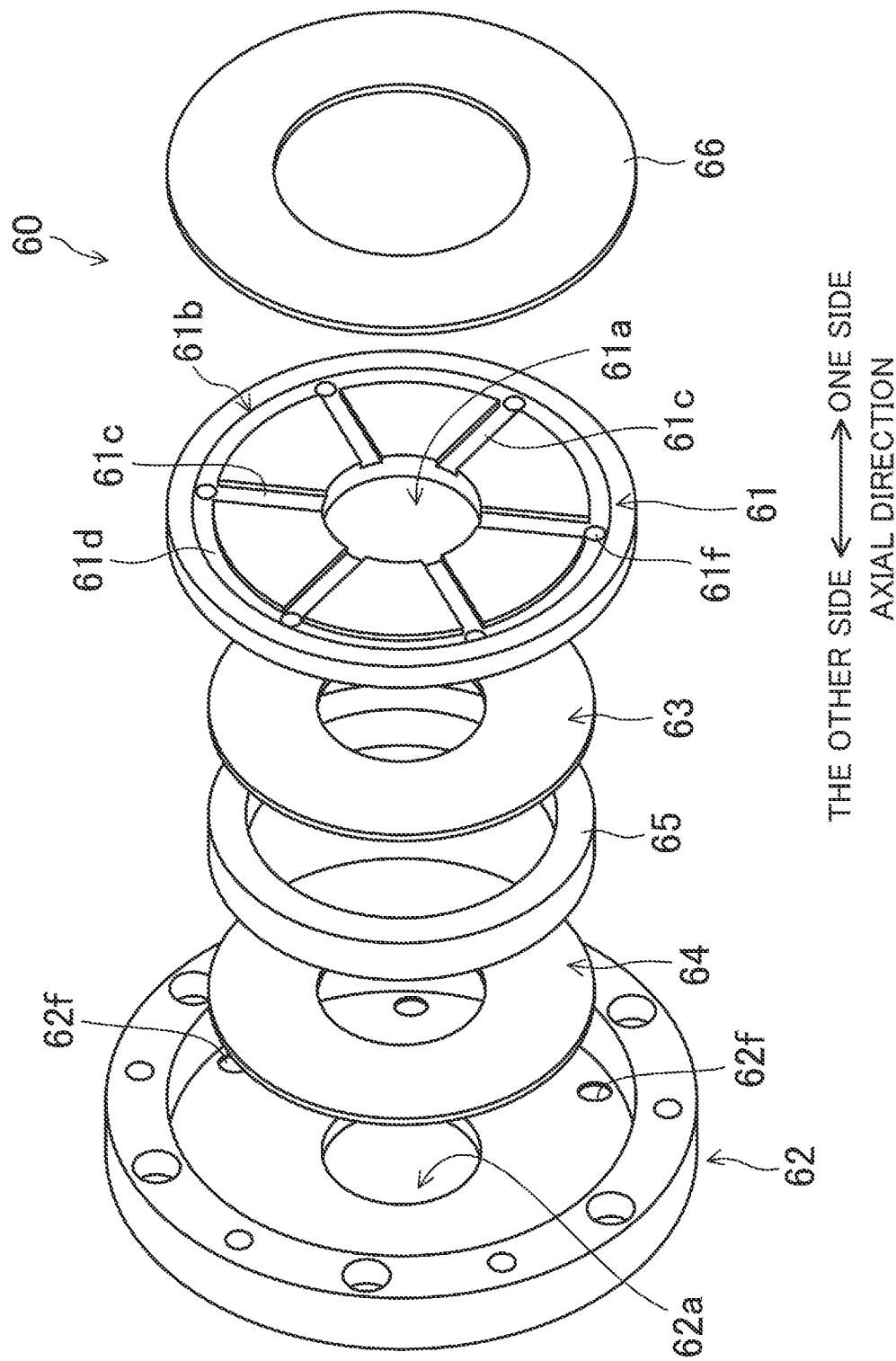
FIG. 3 is an exploded perspective view of a thrust gas bearing (60).

The thrust gas bearing (60) is located between the first radial gas bearing (40) and the high-pressure impeller (12) in the axial direction. As illustrated in FIGS. 2 and 3, the thrust gas bearing (60) includes base parts (61, 62), and gas film forming parts (63, 64) housed in the base parts (61, 62). The thrust gas bearing (60) forms a flat plate-shaped gas film between a collar portion (17) to be described later and each of the base parts (61, 62), thereby regulating (absorbing) the thrust load on the shaft portion (15). A detailed configuration of the thrust gas bearing (60) will be described later.

Some of known centrifugal compressors having a configuration similar to these configurations include a configuration for cooling a gas film forming part to avoid seizure of a thrust gas bearing. Specifically, it is conceivable to cool the gas film forming part, which is housed in the base part, by making a cooling fluid, such as air, flow along the outer surface of the base part. However, if the flow rate of the cooling fluid is uneven between one side and the other side of the base part in the axial direction, seizure may occur on the surface of either side. To address this problem, the centrifugal compressor (10) of the present disclosure is devised so that the gas film forming part be cooled evenly to avoid seizure or any other problems. A configuration according to the present disclosure will be described in detail below.

3. Detailed Configuration of Thrust Gas Bearing

Figure 4:
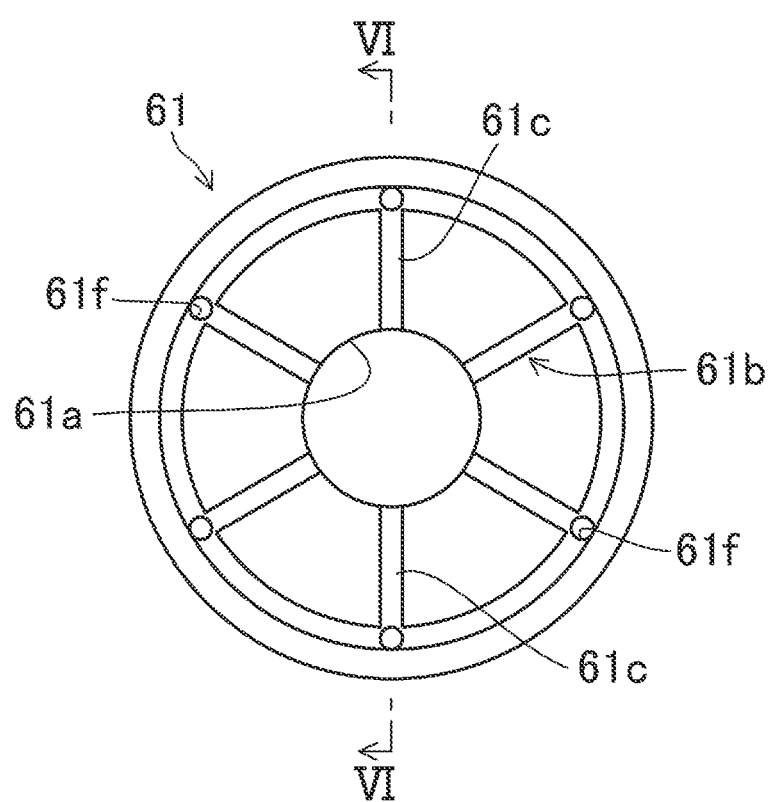
FIG. 4 illustrates a first base part (61) as viewed from one side in an axial direction.
Figure 5:
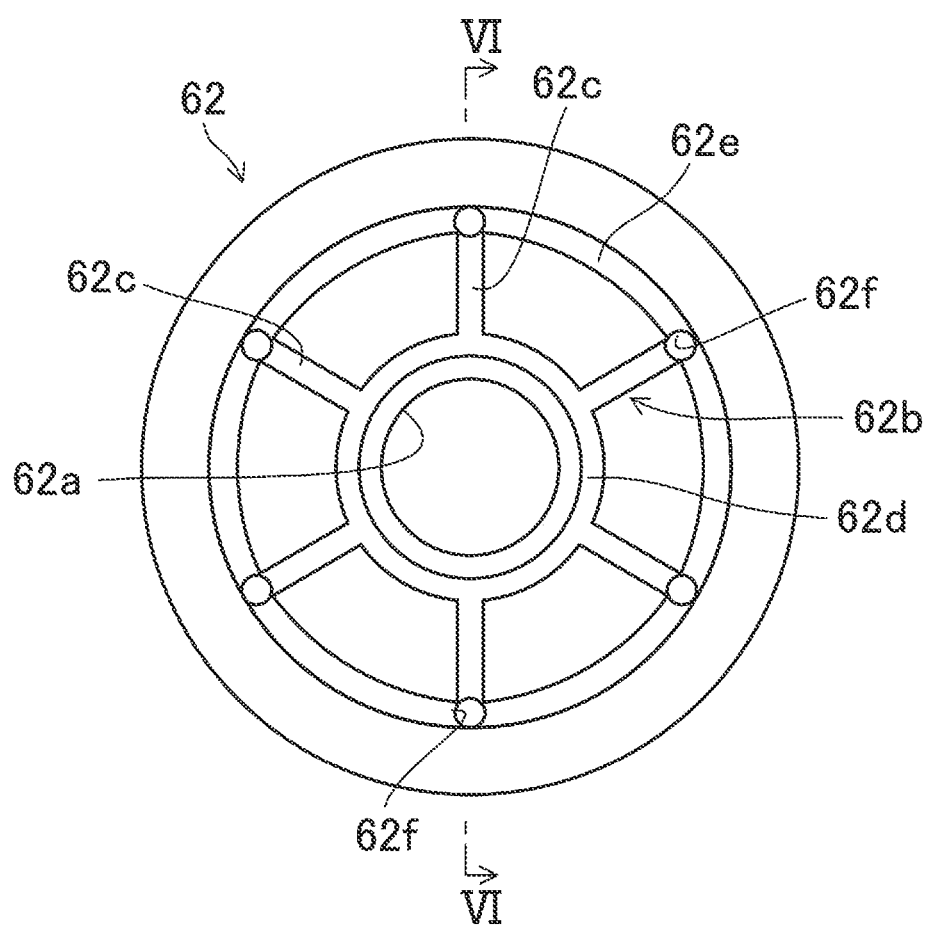
FIG. 5 illustrates a second base part (62) as viewed from the other side in the axial direction.
Figure 6:
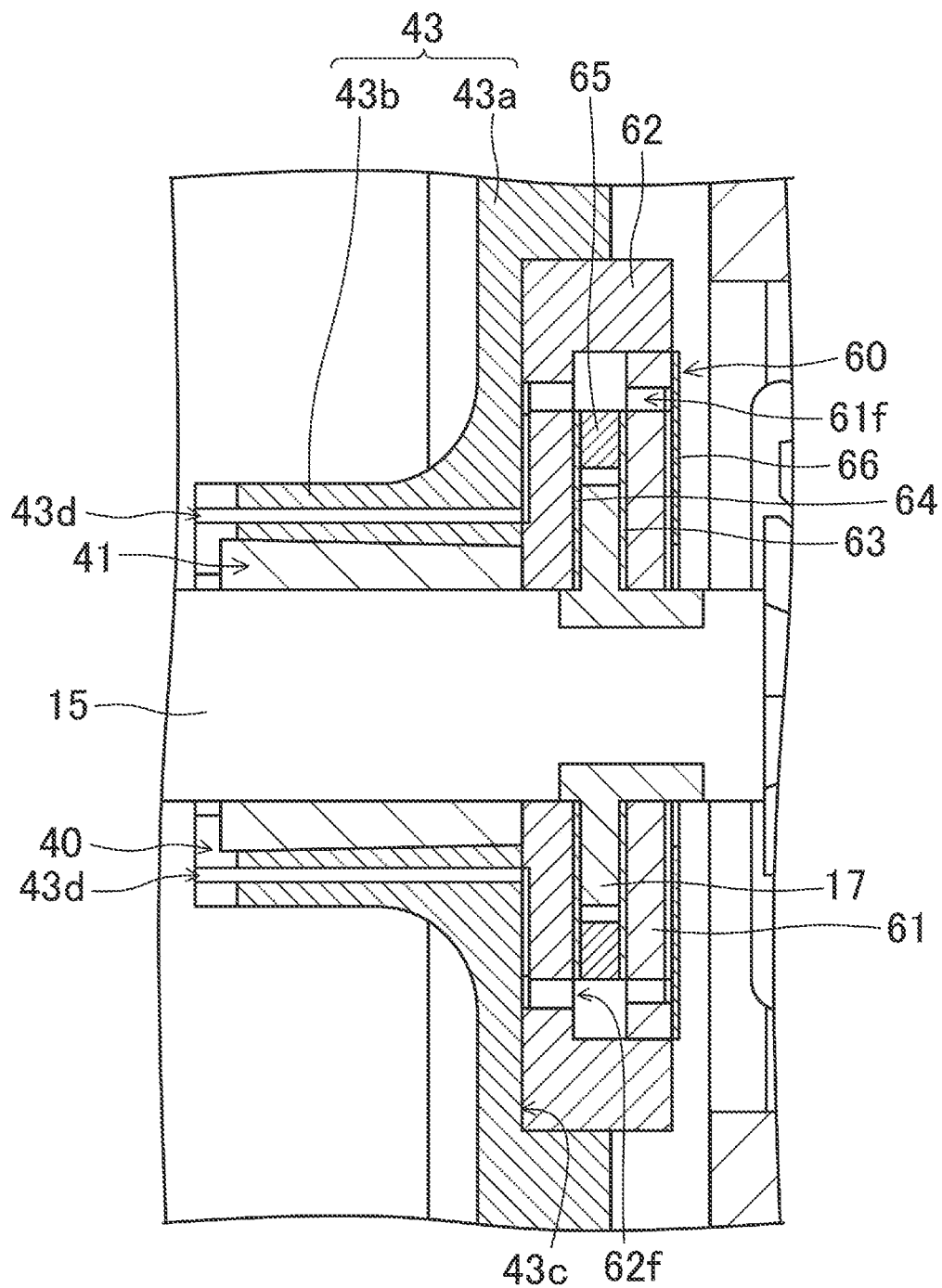
FIG. 6 is an enlarged cross-sectional view illustrating a detailed configuration of the thrust gas bearing (60).
Figure 7:
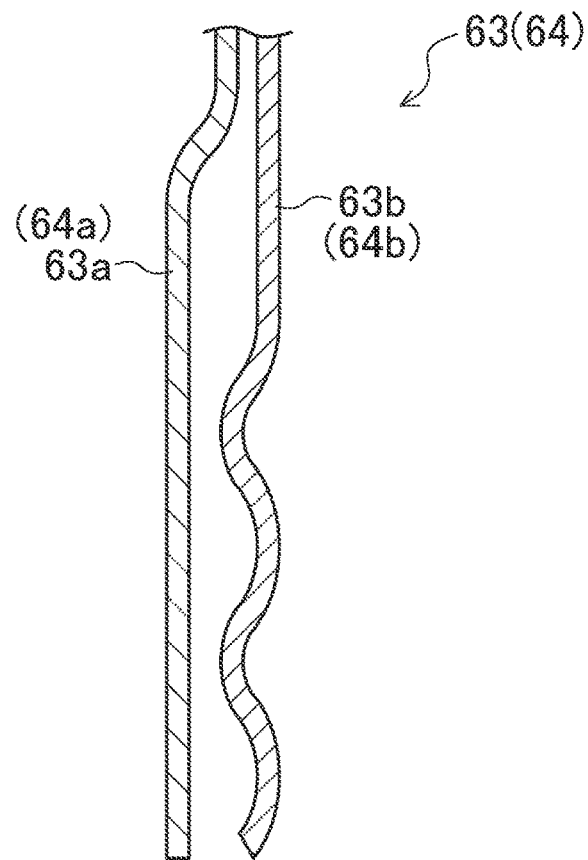
FIG. 7 is a schematic view illustrating a configuration of a gas film forming part (63, 64) of the thrust gas bearing (60).

A detailed configuration of the thrust gas bearing (60) will be described below with reference to FIGS. 3 to 7. FIG. 3 is an exploded perspective view of the thrust gas hearing (60). FIG. 4 illustrates the first base part (61) as viewed from one side in the axial direction. FIG. 5 illustrates the second base part (62) as viewed from the other side in the axial direction. FIG. 6 is an enlarged cross-sectional view illustrating a detailed configuration of the thrust gas bearing (60). FIG. 7 is a schematic view illustrating the configuration of the gas film forming part (63, 64) of the thrust gas hearing (60).

As illustrated in FIG. 6, the thrust gas bearing (60) is attached to the collar portion (17) that is fixed to the shaft portion (15) so as not to be capable of rotating relative to the shaft portion (15). In other words, the thrust gas bearing (60) is attached to a so-called "thrust runner" of the shaft portion (15). The collar portion (17) has an annular shape that extends radially outward of the shaft portion (15) when viewed in the axial direction. The collar portion (17) has a thickness that is uniform in the axial direction.

As illustrated in FIGS. 3 and 6, the thrust gas bearing (60) includes a first gas film forming part (63), a second gas film forming part (64), the first base part (61), the second base part (62), a spacer (65), and a cover (66).

The first gas film forming part (63) is disposed on one side of the collar portion (17) in the axial direction. The first gas film forming part (63) is formed between the collar portion (17) and the first base part (61) to be described later. The first gas film forming part (63) includes a first top foil (63a) and a first hump foil (63b), which are illustrated in FIG. 7. The first top foil (63a) has an annular shape when viewed in the axial direction. The first top foil (63a) has a flat plate shape that has a thickness in the axial direction. The first top foil (63a) is located right beside the one side of the collar portion (17) in the axial direction. The first top foil (63a) is movable in the axial direction.

The first bump foil (63b) has an annular shape when viewed in the axial direction. The first bump foil (63b) has a wave shape, when viewed in the radial direction, in which portions protruding toward the one side in the axial direction and portions protruding toward the other side in the axial direction are alternately connected together. When a load is applied in the axial direction, the first bump foil (63b) is elastically deformable. The first bump foil (63b) is located on the opposite side to the collar portion (17) relative to the first top foil (63a) in the axial direction. The first bump foil (63b) elastically supports the first top foil (63a).

The second gas film forming part (64) is disposed on the other side of the collar portion (17) in the axial direction. The second gas film forming part (64) is formed between the collar portion (17) and the second base part (62) to be described later. The second gas film forming part (64) includes a second top foil (64a) and a second bump foil (64b) which are illustrated in FIG. 7. The second top foil (64a) has an annular shape when viewed in the axial direction. The second top foil (64a) has a flat plate shape that has a thickness in the axial direction. The second top foil (64a) is located right beside the other side of the collar portion (17) in the axial direction. The second top foil (64a) is movable in the axial direction.

The second bump foil (64b) has an annular shape when viewed in the axial direction. The second bump foil (64b) has a wave shape, when viewed in the radial direction, in which portions protruding toward the one side in the axial direction and portions protruding toward the other side in the axial direction are alternately connected together. When a load is applied in the axial direction, the second bump foil (64b) is elastically deformable. The second bump foil (64b) is located on the opposite side to the collar portion (17) relative to the second top foil (64a) in the axial direction. The second bump foil (64b) elastically supports the second top foil (64a).

The first base part (61) illustrated in FIGS. 3 and 4 is disposed to face one axial end surface of the collar portion (17). The first base part (61) covers the first gas film forming part (63) from the one side in the axial direction, and covers the first gas film forming part (63) from the outside in the radial direction. When viewed in the axial direction, a central portion of the first base part (61) has a first through hole (61a). The inner diameter of the first through hole (61a) is larger than the outer diameter of the shaft portion (15). The first base part (61) has a first flow path (61b). The first flow path (61b) is located on a surface of the first base part (61) on the one side in the axial direction.

The first flow path (61b) includes a plurality of first grooves (61c) spaced apart from one another in the circumferential direction. Each first groove (61c) extends in the radial direction. A radially inner end of the first groove (61c) is connected to the first through hole (61a). A radially outer end of the first groove (61c) is connected to a first circumferential groove (61d). The first circumferential groove (61d) is also included in the first flow path (61b). When viewed in the axial direction, the first circumferential groove (61d) is located on the perimeter of a circle around the shaft portion (15).

The first base part (61) has a plurality of first circulation holes (61f) penetrating the first base part (61) in the axial direction at portions where the first grooves (61c) and the first circumferential groove (61d) are connected. That is to say, the plurality of first circulation holes (61f) are spaced apart from one another in the circumferential direction.

The second base part (62) illustrated in FIGS. 3 and 5 is disposed to face the other axial end surface of the collar portion (17). The second base part (62) covers the second gas film forming part (64) from the other side in the axial direction, and covers the second gas film forming part (64) from the outside in the radial direction. When viewed in the axial direction, a central portion of the second base part (62) has a second through hole (62a). The inner diameter of the second through hole (62a) is larger than the outer diameter of the shaft portion (15). The second base part (62) has a second flow path (62b) illustrated in FIG. 5. The second flow path (62b) is located on a surface of the second base part (62) on the other side in the axial direction.

The second flow path (62b) includes a plurality of second grooves (62c) spaced apart from one another in the circumferential direction. Each second groove (62c) extends in the radial direction. A radially inner end of the second groove (62c) is connected to an inner circumferential groove (62d). A radially outer end of the second groove (62c) is connected to an outer circumferential groove (62e). The inner circumferential groove (62d) and the outer circumferential groove (62e) are also included in the second flow path (62b). When viewed in the axial direction, the inner circumferential groove (62d) and the outer circumferential groove (62e) are located on the perimeters of two concentric circles around the shaft portion (15).

The second base part (62) has a plurality of second circulation holes (62f) penetrating the second base part (62) in the axial direction at portions where the second grooves (62c) and the outer circumferential groove (62e) are connected.

The spacer (65) illustrated in FIG. 3 is a plate member having an annular shape when viewed in the axial direction.

The spacer (65) has a thickness that is uniform in the axial direction. The spacer (65) is disposed outside the collar portion (17) in the radial direction. As illustrated in FIG. 6, the spacer (65) is sandwiched between the first top foil (63a) and the second top foil (64a) from both sides in the axial direction.

The cover (66) illustrated in FIG. 3 is a thin plate member having an annular shape when viewed in the axial direction. The outer diameter of the cover (66) is slightly larger than the outer diameter of the first circumferential groove (61d). The inner diameter of the cover (66) is larger than the inner diameter of the first through hole (61a) of the first base part (61).

4. Detailed Configuration of Radial Gas Bearing Unit

Figure 8:
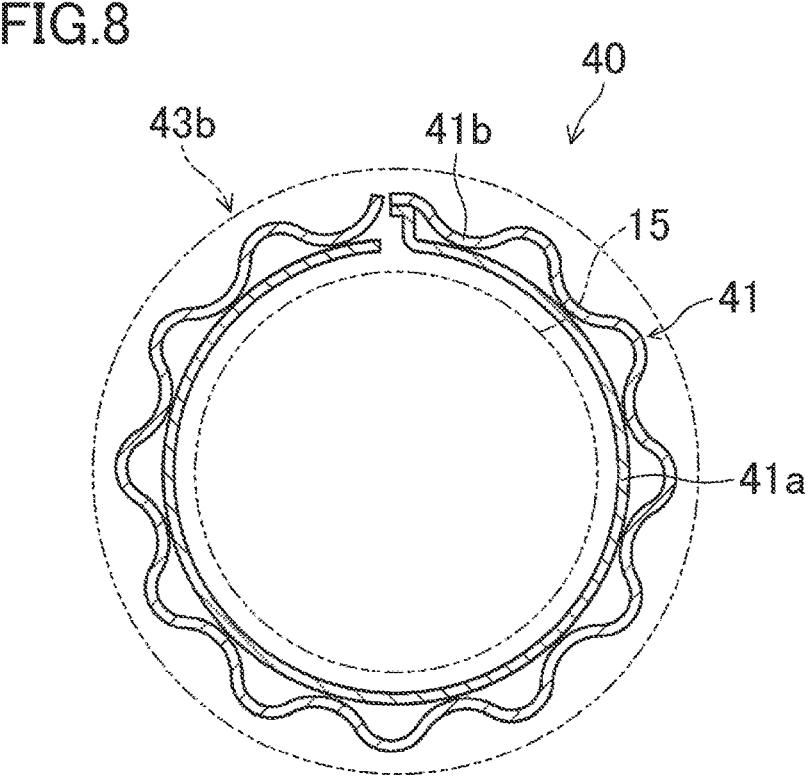
FIG. 8 is a schematic view illustrating a configuration of a tubular gas film forming part (41) of a radial gas bearing (40).

A detailed configuration of the first radial gas bearing (40) will be described below with reference to FIGS. 6 and 8. FIG. 8 is a schematic view illustrating a configuration of a tubular gas film forming part (41) of the radial gas bearing (40). The first radial gas bearing (40) includes the tubular gas film forming part (41) and a third base part (43).

The third base part (43) is disposed on the other side of the second base part (62) in the axial direction. As illustrated in FIG. 6, the third base part (43) includes a disk portion (43a) and a cylindrical portion (43b).

The disk portion (43a) has an annular shape with a thickness that is uniform in the axial direction. The disk portion (43a) forms an end portion of the third base part (43) on the one side in the axial direction. An end surface of the disk portion (43a) on the one side in the axial direction has a recess (43c) recessed toward the other side in the axial direction. The recess (43c) is a columnar space that is short in the axial direction. The outer diameter of the recess (43c) is substantially equal to the outer diameter of the second base part (62).

The cylindrical portion (43b) is a cylindrical portion extending in the axial direction. The cylindrical portion (43b) forms an end portion of the third base part (43) on the other side in the axial direction. An end portion of the cylindrical portion (43b) on the one side in the axial direction and an inner peripheral portion of the disk portion (43a) are connected to each other so as to be tapered smoothly. As illustrated in FIG. 6, the tapered portion extends gradually outward in the radial direction toward the one side in the axial direction. However, the inner peripheral surface of the tapered portion is continuous with the inner peripheral surface of the cylindrical portion (43b).

The third base part (43) has a third flow path (43d). The third flow path (43d) includes a plurality of third flow paths (43d), which are arranged in the third base part (43) so as to be spaced apart from one another in the circumferential direction. The third flow paths (43d) extend in the axial direction across the disk portion (43a) and the cylindrical portion (43b). That is, the third flow paths (43d) pass through the third base part (43) in the axial direction.

The tubular gas film forming part (41) includes a top cylinder (41a) and a bump cylinder (41b), which are illustrated in FIG. 8. FIG. 8 is a cross-sectional view of the tubular gas film forming part (41) as viewed in the axial direction. The top cylinder (41a) has a cylindrical shape extending in the axial direction. The top cylinder (41a) has a thickness that is uniform in the radial direction. The top cylinder (41a) is located immediately outside the shaft portion (15) in the radial direction. The bump cylinder (41b) has a substantially cylindrical shape extending in the axial direction. The bump cylinder (41b) has a wave shape, when viewed in the circumferential direction, in which portions protruding radially outward and portions protruding radially inward are alternately connected together. The bump cylinder (41b) is located immediately outside the top cylinder (41a) in the radial direction. The third base part (43) is located immediately outside the bump cylinder (41b) in the radial direction.

5. Outline of Assembly of Thrust Gas Bearing and Radial Gas Bearing to Shaft Portion A structure of assembly of the thrust gas bearing (60) and the first radial gas bearing (40) to the shaft portion (15) will be schematically described below.

First, the tubular gas film forming part (41) and the third base part (43) are fitted, from the one side in the axial direction, to the shaft portion (15) inserted in the central portion (through hole) of the rotor (16). As illustrated in FIGS. 2 and 6, the third base part (43) is assembled, with the disk portion (43a) facing the one side in the axial direction. In this state, the second base part (62) is assembled to the recess (43c) of the third base part (43). Specifically, the second base part (62) is assembled, with the second flow path (62b) facing the other side in the axial direction. The bottom of the recess (43c) and the second flow path (62b) form a passage through which a cooling refrigerant (fluid) to be described later passes.

The second bump foil (64b) and the second top foil (64a) are housed in this order in the radially inside of the second base part (62) from the one side in the axial direction. Subsequently, the collar portion (17) is fixed to the shaft portion (15) so as not to be capable of rotating relative to the shaft portion (15). The spacer (65) is disposed outside the collar portion (17) in the radial direction. The first top foil (63a) and the first bump foil (63b) are fitted in this order to the shaft portion (15) from the one side in the axial direction. Then, to the shaft portion (15) in this state, the first base part (61) is assembled from the one side in the axial direction. Specifically, the first base part (61) is assembled to the radially inside of the second base part (62), with the first flow path (61b) facing the one side in the axial direction. Finally, the cover (66) is assembled to the surface of the first base part (61) on the one side in the axial direction. The cover (66) is fixed to the first base part (61) and the second base part (62) using fastening members, such as bolts. That is to say, the cover (66), the first base part (61), and the second base part (62) are tightened together by the fastening members. An end surface of the cover (66) on the other side in the axial direction and the first flow path (61b) form a passage through which the cooling refrigerant to be described later passes.

The first flow path (61b) and the second flow path (62b) are connected to each other through the first circulation holes (61f), the space in each of the base parts (61, 62), and the second circulation holes (62f). In this embodiment, the first circulation holes (61f) of the first flow path (61b) and the second circulation holes (62f) of the second flow path (62b) are provided at angular positions overlapping each other when viewed in the axial direction.

6. Outline of Flow of Refrigerant

The operation of the centrifugal compressor (10) with the above configurations and the operation of the entire refrigeration apparatus (100) cause the following flow of the refrigerant.

The refrigerant that has flowed into the low-pressure impeller chamber (21) is compressed to an intermediate pressure by the rotation of the low-pressure impeller (11) in the centrifugal compressor (10). The refrigerant compressed to the intermediate pressure is sent to the high-pressure impeller chamber (22) via the auxiliary circuit (93). The refrigerant that has flowed into the high-pressure impeller chamber (22) is compressed to a high pressure by the rotation of the high-pressure impeller (12). The refrigerant compressed to the high pressure by the centrifugal compressor (10) dissipates heat to air in the condenser (7) and is condensed. The refrigerant condensed in the condenser (7) is decompressed by the first expansion valve (71). The refrigerant decompressed by the first expansion valve (71) absorbs heat from air in the evaporator (8) and evaporates. The centrifugal compressor (10) compresses the refrigerant evaporated in the evaporator (8) again.

Part of the refrigerant that has passed through the condenser (7) flows into the branch circuit (91). The refrigerant flowing through the branch circuit (91) is decompressed by the second expansion valve (72), and is then heated by the heater (73). The refrigerant that has passed through the condenser (7) is substantially a liquid refrigerant, which is decompressed while passing through the second expansion valve (72) and partially becomes a gas refrigerant. Thereafter, the refrigerant is heated by the heater (73) to become substantially a gas refrigerant. This substantially gas refrigerant is a refrigerant that has dissipated heat to the air in the condenser (7), and thus has a relatively low temperature. Specifically, the low-temperature and low-pressure refrigerant gas is supplied as a cooling refrigerant to immediately behind the high-pressure impeller (12) of the centrifugal compressor (10) through the branch circuit (91).

7. First Flow of Refrigerant During Cooling of Gas Beatings

Figure 9:
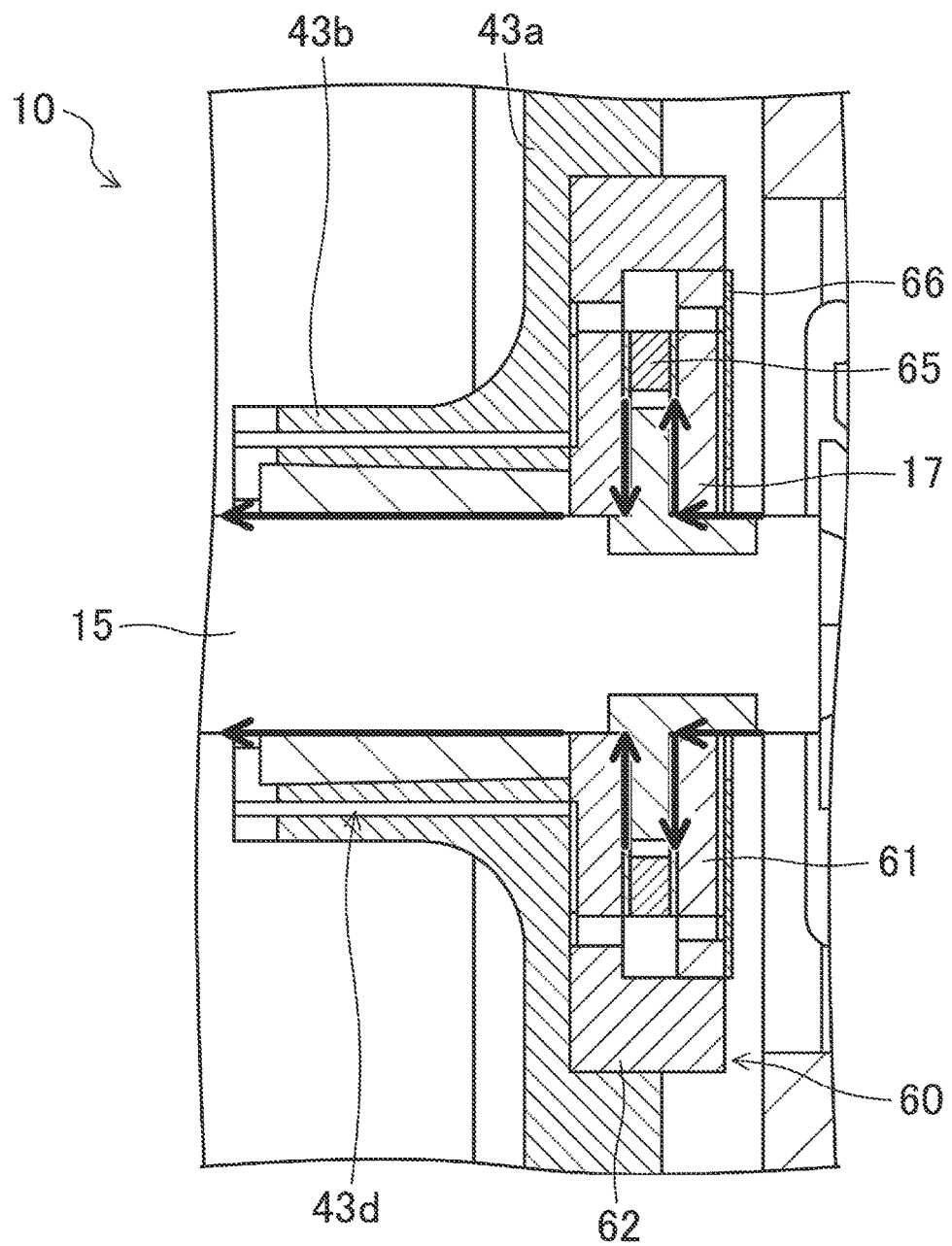
FIG. 9 is a schematic view illustrating a first flow of a refrigerant near the thrust gas bearing (60) and the radial gas bearing (40).

Part of the refrigerant gas supplied to immediately behind the high-pressure impeller (12) flows while being in direct contact with the first gas film forming part (63), the second gas film forming part (64), and the tubular gas film forming part (41) to cool these parts. The first flow of the refrigerant will be simply described below with reference to FIG. 9. FIG. 9 is a schematic view showing the first flow of the refrigerant near the thrust gas bearing (60) and the radial gas bearing (40).

Part of the refrigerant gas supplied to immediately behind the high-pressure impeller (12) flows through the first through hole (61a) of the first base part into the base parts (61, 62) without flowing through the first flow path (61b). The refrigerant flows along the shaft portion (15) to reach the gap between the collar portion (17) and the inner surface of the first base part (61). The refrigerant that has reached the gap between the collar portion (17) and the inner surface of the first base part (61) flows from radially inside toward radially outside. Thus, the refrigerant is in contact with the first gas film forming part (63) located between the collar portion (17) and the inner surface of the first base part (61) and cools the first gas film forming part (63) directly. Thereafter, the refrigerant flows through the gap between the spacer (65) and the collar portion (17) and reaches the gap between the collar portion (17) and the inner surface of the second base part (62). The refrigerant that has reached the gap between the collar portion (17) and the inner surface of the second base part (62) flows from radially outside toward radially inside. Thus, the refrigerant is in contact with the second gas film forming part (64) located between the collar portion (17) and the inner surface of the second base part (62) and cools the second gas film forming part (64) directly.

The refrigerant that has reached an axial center portion of the second gas film forming part (64) passes through the second through hole (62a), and flows through the gap between the shaft portion (15) and the third base part (43) from the one side toward the other side in the axial direction. Thus, the refrigerant is in contact with the tubular gas film forming part (41) located between the outer peripheral surface of the shaft portion (15) and the inner peripheral surface of the third base part (43) and cools the tubular gas film forming part (41) directly.

8. Second Flow of Refrigerant During Cooling of Gas Bearings

Figure 10:
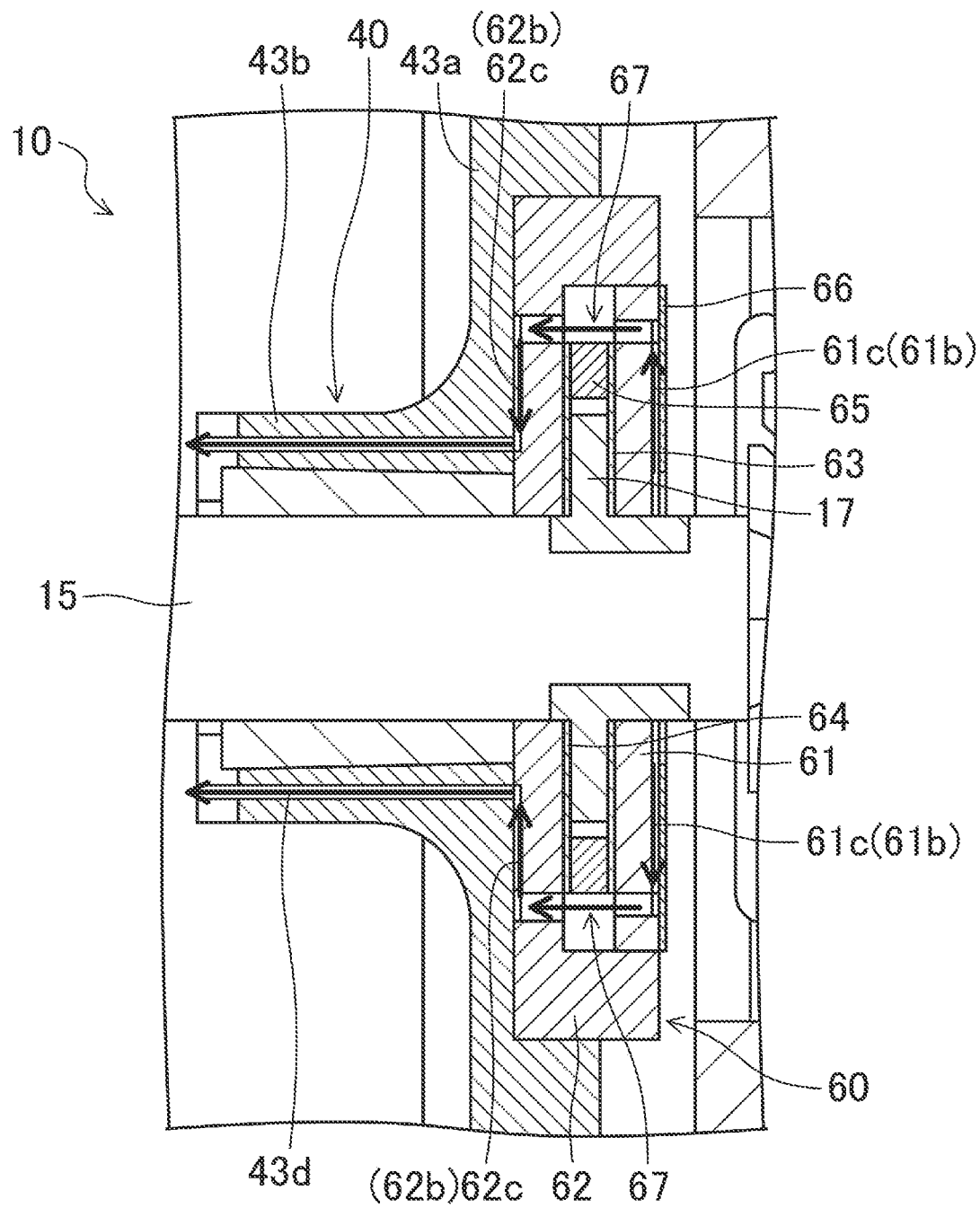
FIG. 10 is a schematic view illustrating a second flow of the refrigerant near the thrust gas bearing (60) and the radial gas bearing (40).

A cooling flow path (67), which is a path of a second flow of the refrigerant during cooling of the gas bearings (40, 60), will be described below with reference to FIG. 10. FIG. 10 is a schematic view showing the second flow of the refrigerant near the thrust gas bearing (60) and the radial gas bearing (40).

As illustrated in FIG. 10, the refrigerant gas supplied to immediately behind the high-pressure impeller (12) flows through the gap between the first base part (61) and the back surface of the high-pressure impeller (12) into a radially inner end portion of the first flow path (61b). Then, the refrigerant passes through the first flow path (61b) from radially inside toward radially outside. The refrigerant that has reached a radially outer end portion of the first flow path (61b) flows through the first circumferential groove (61d), and then flows through the first circulation holes (61f) into the space surrounded by the first base part (61) and the second base part (62). The refrigerant in the base parts (61, 62) passes through the second circulation holes (62f), and flows through the outer circumferential groove (62e). Then, the refrigerant flows into a radially outer end portion of the second flow path (62b). Thereafter, the refrigerant passes through the second flow path (62b) from radially outside toward radially inside.

At this moment, the refrigerant flows uniformly. In other words, the refrigerant flows through the first flow path (61b) and the second flow path (62b) in series in this order. Thus, uneven flow rates of the refrigerant are less likely to occur between the outside of the first gas film forming part (63) and the outside of the second gas film forming part (64). As a result, a problem is less likely to occur in which seizure occurs in either one of the first gas film forming part (63) or the second gas film forming part (64).

The refrigerant passes through the circumferential grooves (61d, 62e) while flowing from the first flow path (61b) to the second flow path (62b) in series. This makes the flow of the refrigerant uniform in the circumferential direction.

Thereafter, the refrigerant that has reached the radially inner end portion of the second flow path (62b) flows through the third flow paths (43d) of the third base part (43) from the one side toward the other side in the axial direction. Since the third base part (43) has the plurality of third flow paths (43d) spaced apart from one another in the circumferential direction as described above, it is easy to cool the whole circumference of the tubular gas film forming part (41) uniformly.

The refrigerant that has directly or indirectly cooled the first gas film forming, part (63), the second gas film forming part (64), and the tubular gas film forming part (41) is supplied to a portion of the refrigerant circuit (150) immediately upstream of the centrifugal compressor (10) via the return circuit (92) shown in FIG. 1. Thus, the refrigerant used to cool the gas bearings merges with the refrigerant flowing through the main circuit (90), thereby performing a refrigeration cycle.

9. Summary

As indicated above, the cooling flow path (67) of the thrust gas bearing (60) of this embodiment includes the first flow path (61b) and the second flow path (62b). The first flow path (61b) is formed on one end side, in the axial direction, of the first base part (61) and extends from the axial center toward the outer periphery of the first base part (61). The second flow path (62*b*) is formed on the other side of the second base part (62) in the axial direction, and extends from the outer periphery toward the axial center of the second base part (62). The second flow path (62*b*) is located downstream of the first flow path (61*b*).

The fluid (refrigerant) therefore flows through the first flow path (61*b*) and the second flow path (62*b*) in series in this order. This configuration can reduce a situation in which most of the fluid flows through one of the first flow path (61*b*) or the second flow path (62*b*). As a result, it is possible to cool the first gas film forming part (63) and the second gas film forming part (64) efficiently.

In the thrust gas bearing (60) of this embodiment, the first flow path (61*b*) includes the first grooves (61*c*) formed on a surface of the first base part (61) on the one end side in the axial direction. The second flow path (62*b*) includes the second grooves (62*c*) formed on a surface of the second base part (62) on the other end side in the axial direction.

In this configuration, a flow of the cooling fluid along the outer surfaces of the first base part (61) and the second base part (62) can indirectly cool the gas film forming parts (63, 64) inside the base parts (61, 62). It is thus possible to cool the gas film forming parts (63, 64) with a simple configuration without forming complicated work on the surfaces of the top foils (63*a*, 64*a*) or the like.

In the thrust gas bearing (60) of this embodiment, the first flow path (61*b*) includes the plurality of first grooves (61*c*) extending in the radial direction and spaced apart from one another in the circumferential direction. The second flow path (62*b*) includes the plurality of second grooves (62*c*) extending in the radial direction and spaced apart from one another in the circumferential direction.

This enables efficient cooling of both axial sides of a pair of the gas film forming parts (63, 64) via the base parts (61, 62).

In the thrust gas bearing (60) of this embodiment, the first gas film forming part (63) and the second gas film forming part (64) each include the top foil (63*a*, 64*a*) and the bump foil (63*b*, 64*b*) that elastically supports the top foil (63*a*, 64*a*).

This configuration enables efficient cooling by making a gas flow through the bump foils (63*b*, 64*b*) that elastically support the top foils (63*a*, 64*a*).

The centrifugal compressor (10) of this embodiment includes the electric motor (18) that is a combination of the rotor (16) and the stator (14), the shaft portion (15) coupled to the electric motor (18), the compression mechanism (19) driven by the shaft portion (15), and the first radial gas hearing (40). The first radial gas bearing (40) is located on the shaft portion (15), and is closer to the other side in the axial direction than the thrust gas bearing (60) is. The cooling flow path (67) includes the third flow paths (43*d*) formed in the first radial gas bearing (40). The third flow paths (43*d*) are located downstream of the second flow path (62*b*).

Thus, the cooling fluid flowing consecutively through the first flow path (61*b*), the second flow path (62*b*), and the third flow paths (43*d*) in the stated order can efficiently cool not only the thrust gas bearing (60) but also the first radial gas bearing (40).

In the centrifugal compressor (10) of this embodiment, the first radial gas bearing (40) includes the tubular gas film forming part (41) extending in a tubular shape in the axial direction, and the third base part (43) covering the tubular gas film forming part (41) from the outside in the radial direction. The third base part (43) has the third flow paths (43*d*).

In this configuration, the flow of the cooling fluid through the third flow paths (43*d*) of the third base part (43) can indirectly cool the tubular gas film forming part (41) inside the third base part (43) in the radial direction. It is thus possible to cool the tubular gas film forming part (41) with a simple configuration without forming complicated work on the surface of the top cylinder (41*a*) or the like.

In the centrifugal compressor (10) of this embodiment, the third flow paths (43*d*) extend in the axial direction. The third base part (43) has the plurality of third flow paths (43*d*) spaced apart from one another in the circumferential direction.

It is thus easy to cool the whole circumference of the tubular gas film forming part (41) uniformly.

The refrigeration apparatus (100) described in this embodiment includes the centrifugal compressor (10), and is provided with the refrigerant circuit (150) in which the refrigerant circulates to perform a refrigeration cycle. The refrigerant circuit (150) includes the branch circuit (supply path) (91) through which the refrigerant is supplied to a refrigerant flow path.

It is therefore possible to cool the thrust gas bearing (60) and the first radial gas bearing (40) efficiently by using the low-temperature and low-pressure refrigerant gas.

Variation

While the exemplary embodiment of the present disclosure has been described above, the present disclosure is not limited to the foregoing embodiment.

In the foregoing embodiment, only a portion of the centrifugal compressor (10) on the one side in the axial direction is provided with the thrust gas hearing (60) and the cooling flow path (67). However, the configuration is not limited thereto, and portions of a centrifugal compressor on both sides in the axial direction may be each provided with a thrust gas bearing and a cooling flow path.

In the foregoing embodiment, the thrust gas hearing (60) is located between the first radial gas bearing (40) and the high-pressure impeller (12) in the axial direction. Alternatively, a thrust gas bearing may be provided between the second radial gas bearing (50) and the low-pressure impeller (11) in the axial direction.

Figure 11:
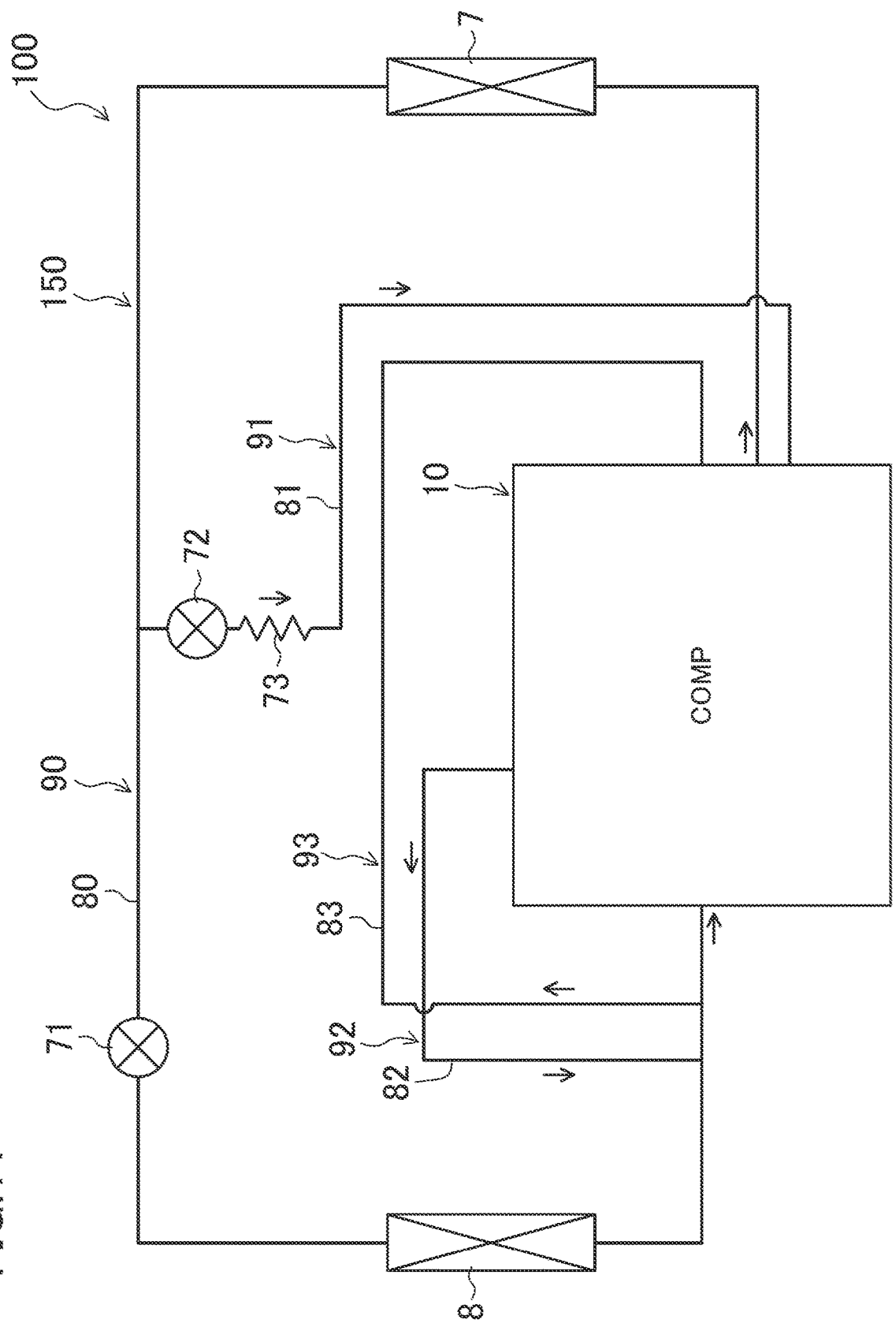
FIG. 11 is an outline drawing illustrating refrigerant circuit (150) according to another embodiment.

In the foregoing embodiment, the refrigerant that has been compressed by the low-pressure impeller (11) is supplied to the high-pressure impeller (12). Alternatively, as illustrated in FIG. 11, the refrigerant may be supplied to the low-pressure impeller (11) and the high-pressure impeller (12) in parallel.

In the foregoing embodiment, the axially outer end surface of each base part (61, 62) has the groove (61*c*, 62*c*) through which the cooling refrigerant passes. Alternatively, each base part may include therein a passage through which the cooling refrigerant passes.

The detailed configurations and layout of components may be different from those illustrated in each of the drawings of the present disclosure.

The invention claimed is:
1. A thrust gas bearing, comprising:
a collar portion fixed to a shaft portion;
a first base part facing one axial end surface of the collar portion;
a first gas film forming part formed between the collar portion and the first base part;
a second base part facing an other axial end surface of the collar portion;
a second gas film forming part formed between the collar portion and the second base part; and a cooling flow path configured to carry a fluid flow therethrough, the cooling flow path including
a first flow path formed on one end side, in an axial direction, of the first base part and extending from a radial inner periphery toward a radial outer periphery of the first base part, the one end side being opposite the first gas film forming part, and
a second flow path formed on an other end side, in the axial direction, of the second base part and extending from a radial outer periphery toward a radial inner periphery of the second base part, the other end side being opposite the second gas film forming part,
the second flow path being located downstream of the first flow path.

2. The thrust gas bearing of claim 1, wherein
the first flow path includes a first groove formed on a surface of the first base part on the one end side facing in the axial direction, and
the second flow path includes a second groove formed on a surface of the second base part on the other end side facing in the axial direction.

3. The thrust gas bearing of claim 2, wherein
the first groove included in the first flow path includes a plurality of first grooves extending in a radial direction and spaced apart from each other in a circumferential direction, and
the second groove included in the second flow path includes a plurality of second grooves extending in the radial direction and spaced apart from each other in the circumferential direction.

4. The thrust gas bearing of claim 3, wherein
at least one of the first gas film forming part and the second gas film forming part includes
a top foil, and
a bump foil elastically supporting the top foil.

5. A centrifugal compressor including the thrust gas bearing of claim 3, the centrifugal compressor further comprising:
an electric motor;
the shaft portion coupled to the electric motor;
a compression mechanism driven by the shaft portion; and
a radial gas bearing located on the shaft portion, the radial gas bearing being closer to the other end side in the axial direction than the thrust gas bearing,
the cooling flow path including a third flow path formed in the radial gas bearing, and
the third flow path being located downstream of the second flow path.

6. The thrust gas bearing of claim 2, wherein
at least one of the first gas film forming part and the second gas film forming part includes
a top foil, and
a bump foil elastically supporting the top foil.

7. A centrifugal compressor including the thrust gas bearing of claim 2, the centrifugal compressor further comprising:
an electric motor;
the shaft portion coupled to the electric motor;
a compression mechanism driven by the shaft portion; and
a radial gas bearing located on the shaft portion, the radial gas bearing being closer to the other end side in the axial direction than the thrust gas bearing,
the cooling flow path including a third flow path formed in the radial gas bearing, and
the third flow path being located downstream of the second flow path.

8. The thrust gas bearing of claim 1, wherein
at least one of the first gas film forming part and the second gas film forming part includes
a top foil, and
a bump foil elastically supporting the top foil.

9. A centrifugal compressor including the thrust gas bearing of claim 8, the centrifugal compressor further comprising:
an electric motor;
the shaft portion coupled to the electric motor;
a compression mechanism driven by the shaft portion; and
a radial gas bearing located on the shaft portion, the radial gas bearing being closer to the other end side in the axial direction than the thrust gas bearing,
the cooling flow path including a third flow path formed in the radial gas bearing, and
the third flow path being located downstream of the second flow path.

10. A centrifugal compressor including the thrust gas bearing of claim 1, the centrifugal compressor further comprising:
an electric motor;
the shaft portion coupled to the electric motor;
a compression mechanism driven by the shaft portion; and
a radial gas bearing located on the shaft portion, the radial gas bearing being closer to the other end side in the axial direction than the thrust gas bearing,
the cooling flow path including a third flow path formed in the radial gas bearing, and
the third flow path being located downstream of the second flow path.

11. The centrifugal compressor of claim 10, wherein
the radial gas bearing includes
a tubular gas film forming part extending in a tubular shape in the axial direction, and
a third base part covering the tubular gas film forming part from radially outside, and
the third base part has the third flow path.

12. The centrifugal compressor of claim 11, wherein
the third flow path extends in the axial direction, and
the third flow path included in the third base part includes a plurality of third flow paths spaced apart from each other in a circumferential direction.

13. A refrigeration apparatus including the centrifugal compressor of claim 12, the refrigeration apparatus further comprising:
a refrigerant circuit configured to circulate a refrigerant to perform a refrigeration cycle, the refrigerant circuit including
the centrifugal compressor, and
a supply path through which the refrigerant can be supplied to the cooling flow path.

14. A refrigeration apparatus including the centrifugal compressor of claim 11, the refrigeration apparatus further comprising:
a refrigerant circuit configured to circulate a refrigerant to perform a refrigeration cycle, the refrigerant circuit including
the centrifugal compressor, and
a supply path through which the refrigerant can be supplied to the cooling flow path.

15. A refrigeration apparatus including the centrifugal compressor of claim 10, the refrigeration apparatus further comprising:
a refrigerant circuit configured to circulate a refrigerant to perform a refrigeration cycle, the refrigerant circuit including the centrifugal compressor, and
a supply path through which the refrigerant can be supplied to the cooling flow path.

* * * * *